US008248423B2

(12) United States Patent  (10) Patent No.: US 8,248,423 B2
Howell et al.  (45) Date of Patent: Aug. 21, 2012

(54) STRATEGIES FOR PROCESSING MEDIA INFORMATION USING A PLUG-IN PROCESSING MODULE IN A PATH-AGNOSTIC MANNER

(75) Inventors: Gareth Howell, Kirkland, WA (US); Thobias M. Jones, Redmond, WA (US); Nishad Mulye, Redmond, WA (US); Gurpratap Virdi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/016,686

(22) Filed: Jan. 28, 2011

(65) Prior Publication Data
US 2011/0128290 A1 Jun. 2, 2011

Related U.S. Application Data

(62) Division of application No. 11/179,013, filed on Jul. 11, 2005, now Pat. No. 7,903,117.

(51) Int. Cl.
*G06F 15/80* (2006.01)
*G06T 1/20* (2006.01)
(52) U.S. Cl. ........................................ 345/505; 345/506
(58) Field of Classification Search .................. 345/505, 345/506
See application file for complete search history.

(56) References Cited

U.S. PATENT DOCUMENTS

| 5,644,364 A * | 7/1997 | Kurtze et al. ................. 348/584 |
| 5,913,038 A | 6/1999 | Griffiths |
| 6,581,102 B1 * | 6/2003 | Amini et al. ................... 709/231 |
| 6,853,380 B2 | 2/2005 | Alcorn |
| 7,350,228 B2 * | 3/2008 | Peled et al. ........................ 726/6 |
| 7,609,653 B2 | 10/2009 | Amin et al. |
| 2002/0104096 A1 * | 8/2002 | Cramer et al. ................. 725/113 |
| 2002/0116707 A1 | 8/2002 | Morris et al. |
| 2005/0021859 A1 | 1/2005 | Willian et al. |
| 2006/0230042 A1 * | 10/2006 | Butler et al. ........................ 707/9 |

OTHER PUBLICATIONS

"DirectShow System Overview," available at [[http://msdn.microsoft.com/library/default.asp?url=/library/en-us/wcedshow/html/_dxce_dshow_directshow_system_overview.asp]], accessed on Nov. 9, 2005, 1 page.
"Features of the VMR," available at [[http://msdn.microsoft.com/library/default.asp?url=/library/en-us/directshow/htm/newfeaturesofthevmr.asp]], accessed on Nov. 9, 2005, 1 page.

(Continued)

*Primary Examiner* — Daniel Washburn
(74) *Attorney, Agent, or Firm* — Lee & Hayes, PLLC

(57) ABSTRACT

A media processing framework includes multiple media processing paths. At least one of the media processing paths includes a media processing pipeline which is in-process with respect to an application which interacts with the media processing pipeline. At least one other of the media processing paths includes a media processing pipeline which is out-of-process with respect to the application. The application can specify a custom plug-in presenter module to be set in either the in-process media processing pipeline or the out-of-process media processing pipeline. The application need not be "aware" of the pipeline that is being used, whether the pipeline is in-process or out-of-process, or the security level that is applied to the media processing pipeline. Both the in-process and the out-of-process media processing pipelines can supply media information to a presentation processor, such as a compositing engine.

20 Claims, 10 Drawing Sheets

OTHER PUBLICATIONS

"Introduction to DirectShow Application Programming," available at [[http://msdn.microsoft.com/library/default.asp?url=/library/en-us/directshow/htm/introductiontodirectshowapplicationprogramming.asp]], accessed on Nov. 9, 2005, 2 pages.

"Overview of Data Flow in DirectShow," available at [[http://msdn.microsoft.com/library/default.asp?url=/library/en-us/directshow/htm/overviewofdataflowindirectshow.asp]], accessed on Nov. 9, 2005, 2 pages.

"Plug-in Distributors," available at [[http://msdn.microsoft.com/library/default.asp?url=/library/en-us/directshow/htm/plugindistributors.asp]], accessed on Nov. 9, 2005, 1 page.

"Using the Video Mixing Renderer," available at [[http://msdn.microsoft.com/library/default.asp?url=/library/en-us/directshow/htm/usingthevideomixingrenderer.asp]], accessed on Nov. 9, 2005, 1 page.

"VMR Filter Components," available at [[http://msdn.microsoft.com/library/default.asp?url=/library/en-us/directshow/htm/vmrfiltercomponents.asp]], accessed on Nov. 9, 2005, 1 page.

* cited by examiner

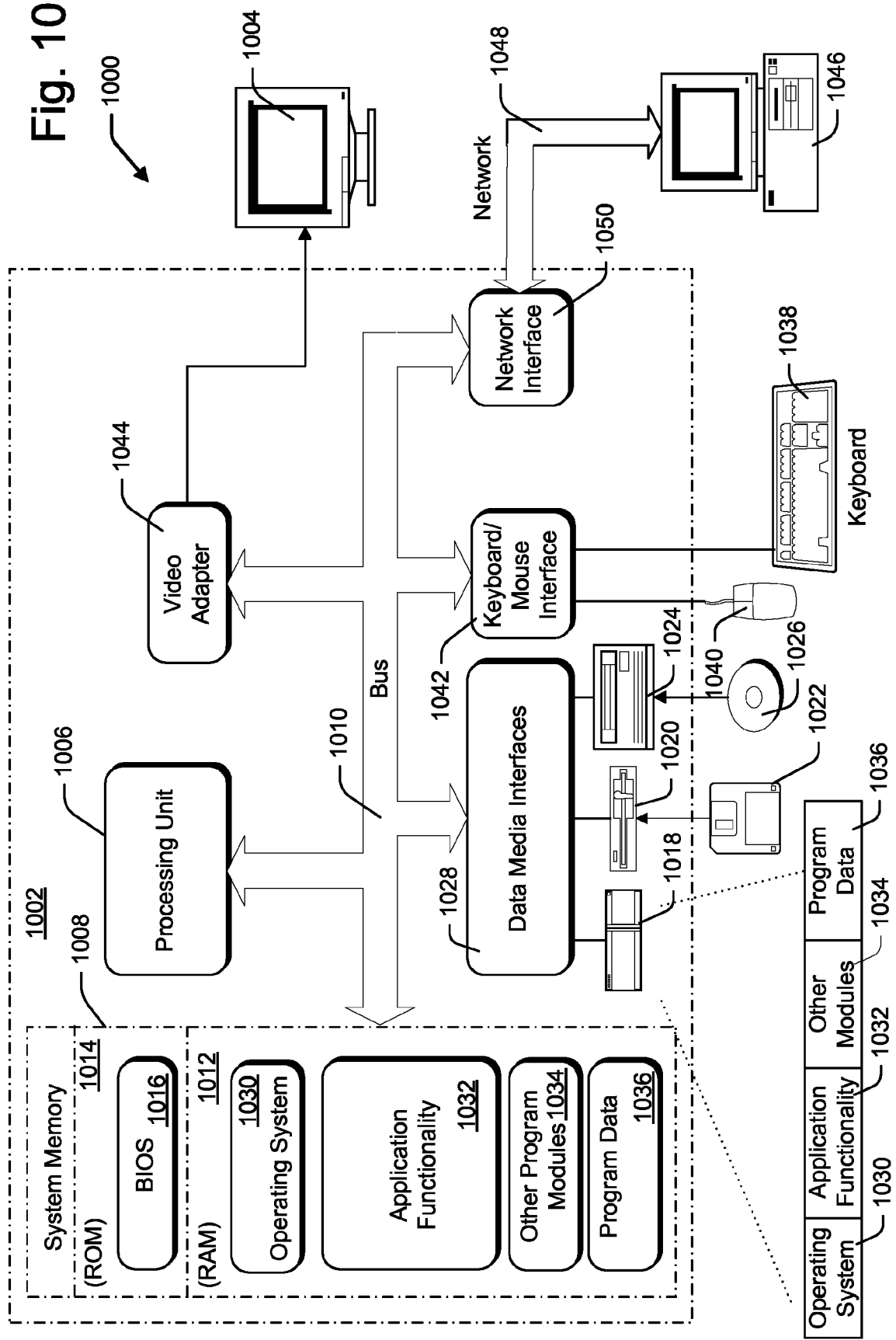

STRATEGIES FOR PROCESSING MEDIA INFORMATION USING A PLUG-IN PROCESSING MODULE IN A PATH-AGNOSTIC MANNER

CROSS REFERENCE TO RELATED PATENT APPLICATIONS

This application is a divisional of, and claims priority to, U.S. patent application Ser. No. 11/179,013, filed Jul. 11, 2005, entitled "Strategies for Processing Media Information Using a Plug-in Processing Module in a Path-Agnostic Manner," which application is hereby incorporated in its entirety by reference.

BACKGROUND

Developers of media processing applications strive to provide versatile media processing functionality that can process many types of media formats. However, this objective presents many challenges. For instance, the industry has developed different media processing technologies for processing different kinds of formats. Further, the industry may apply different functionality to process protected content compared to unprotected content. (Protected content refers to content that should be subjected to safeguards to prevent malicious access to the content.) Thus, media processing functionality which seeks to process different formats and types of content may need to integrate different technologies. This may be a problematic requirement, as the different technologies may apply greatly differing processing paradigms. For instance, different technologies may apply different paradigms to create and manage media processing pipelines. This problem is exacerbated in those cases in which an application is required to rapidly and gracefully transition from one processing paradigm to another, such as when the application processes a playlist containing content items having differing media formats and possibly different security levels associated with the content items.

One approach to providing a versatile media processing application is to add intelligence to the application which defines the manner in which the application interacts with different media processing pipelines and associated formats. For example, the developer of an application can include a first application module which is specifically tailored to interact with a first set of media formats, a second application module which is specifically tailored to interact with a second set of media formats, and so on. However, this approach is problematic because it complicates the application, essentially making it "top-heavy" by incorporating logic to deal with different media processing formats. This approach is also not very extensible, meaning that it cannot be gracefully modified to account for modifications to existing formats and media processing technologies, and/or the introduction of new formats and media processing technologies.

A particular difficultly arises in those technologies which permit a user to supply plug-in processing modules for use in a media processing pipeline. For example, Microsoft Corporation of Redmond, Wash. provides media processing technology which constructs a media processing pipeline (defining a "graph") by combining various filters together to achieve a desired processing operation. Microsoft Corporation further provides functionality which allows a user to "plug" a custom presenter module into a rendering module used in this graph. The presenter module serves to process the media information in a prescribed manner for output to a target device or other destination. However, such a custom presenter module is traditionally designed to function in the context of one particular graph associated with one particular technology. This makes it difficult to meet the objective of versatility discussed above. This is because the custom presenter module might not work well in the context of another kind of graph associated with a different technology (meaning that the custom presenter module cannot be "plugged into" another kind of graph). The ad hoc approach to application development described above can address this solution by providing different presenter modules which can be plugged into different respective graphs. But as mentioned, this approach is not optimal, as it complicates the application and/or the custom presenter modules with additional logic. Moreover, this logic is not readily extensible to address changes in media processing technologies.

There is therefore an exemplary need for more satisfactory solutions for processing media information.

SUMMARY

This description sets forth strategies for addressing at least the above-described needs in the art.

According to one exemplary implementation, strategies are described for setting a custom presenter module in a media processing system that includes at least two media processing paths. The media processing paths invoke different media processing graphs. One of the graphs may include a media processing pipeline that is in-process with respect to an application which interacts with the media processing pipeline. In this case, the application sets the custom presenter module in the in-process media processing pipeline. Another of the graphs may include a media processing pipeline that is out-of-process with respect to the application. In this case, the application sets the custom presenter module in the out-of-process media processing pipeline.

By virtue of the above feature, the user can simply plug in the custom presenter module, and the underlying media processing system can then automatically decide which media processing path should be invoked (based on, for instance, the format used to express the media information that is being processed, and/or the security level associated with the media information). Neither the application itself nor the custom presenter module need be specifically designed to interact with a specific media processing pipeline associated with specific technology. That is, the custom presenter module works equally well in the in-process media processing pipeline and the out-of-process media processing pipeline. For this reason, the complexity of the multiple-path processing environment can be abstracted away from the application itself, potentially reducing the complexity of the application. The above-described approach also provides a more uniform and extensible approach to processing different media formats and content types.

According to another exemplary feature, different media processing paths may rely on different security paradigms for processing media information. An application which seeks to process protected content can pass the media information to a secure process, while an application which seeks to process unprotected content can rely on a non-secure process. Because path-specific logic is abstracted away from the application, the application may also take an agnostic approach with respect to whether or not the media information is protected or unprotected. In other words, the application can forward media information and a custom presenter module to the media processing system without making special provisions for whether the information is protected or unprotected; the system automatically selects an appropriate media processing path to process the information and plugs the custom presenter module into that path without special intervention by the user and without special logic implemented at the application level.

In one exemplary implementation, a single entity (e.g., a single software development company) furnishes all of the media processing paths. In another implementation, different entities can build their own media process paths that accept a custom media presenter according to the above-described principles. In this scenario, an application can rely on a number of different media processing paths produced by different companies. The system described above abstracts away the differences between the paths, allowing the application to adopt an agnostic approach with respect to the underlying complexity and variations in the underlying paths.

According to another exemplary feature, when an out-of-process media processing pipeline is invoked, the system provides an activator object for marshalling graph topology information from an application process to a separate process. The media processing pipeline, along with the selected custom presenter module, is created in the separate process (i.e., the out-of-process process).

According to another exemplary feature, both the in-process media processing pipeline and the out-of-process media processing pipeline communicate their output to a presentation processor, such as a compositing engine. The presentation processor may represent a secure process or a non-secure process. Moreover, a communication link between the media processing pipelines and the presentation processor may represent a secure path or a non-secure path. The use of the common presentation processor facilitates the uniform integration of different processing paths.

The above-described media processing system has various uses. In one particularly beneficial use, a media player can rely on the system to process a sequence of media content items specified in a playlist. The content items can comprise media files, DVDs, network-accessible sources of media information, and so forth. The content items may have different formats, and may contain a mixture of protected content and unprotected content. The media player can rely on the system to quickly and gracefully transition from one content item to another, and possibly combine media information from different content items together (e.g., to produce transition effects, such as fades, upon the transition from one content presentation to another).

Still further features and attendant benefits of the strategies will be set forth below.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 10 shows an exemplary computer environment for implementing aspects of the system of FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This description sets forth exemplary strategies for processing media information using plural selectable media processing paths. At least one path involves the use of an in-process media processing pipeline (with respect to an application which interacts with the media processing pipeline). At least one other path involves the use of an out-of-process media processing pipeline. A user can plug a custom presenter into such a framework without necessarily needing to take consideration of the path that will be invoked in processing media information, or the security level applied to the selected path.

As to terminology, the term "media information" refers to any data represented in electronic form that can be consumed by a user. The media information can include any information that conveys audio and/or video information, such as audio resources (e.g., music, spoken word subject matter, etc.), still picture resources (e.g., digital photographs, etc.), moving picture resources (e.g., audio-visual television media programs, movies, etc.), and so on.

This disclosure includes the following sections. Section A presents an exemplary system for processing media information using plural paths. Section B describes an exemplary method of operation of the system of Section A. And Section C describes an exemplary computer environment for implementing aspects of the system of Section A.

A. Exemplary System

Generally, any of the functions described with reference to the figures can be implemented using software, firmware (e.g., fixed logic circuitry), manual processing, or a combination of these implementations. The term "logic, "module" or "functionality" as used herein generally represents software, firmware, or a combination of software and firmware. For instance, in the case of a software implementation, the term "logic," "module," or "functionality" represents program code (or declarative content) that performs specified tasks when executed on a processing device or devices (e.g., CPU or CPUs). The program code can be stored in one or more computer readable memory devices. More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

Figure 1:
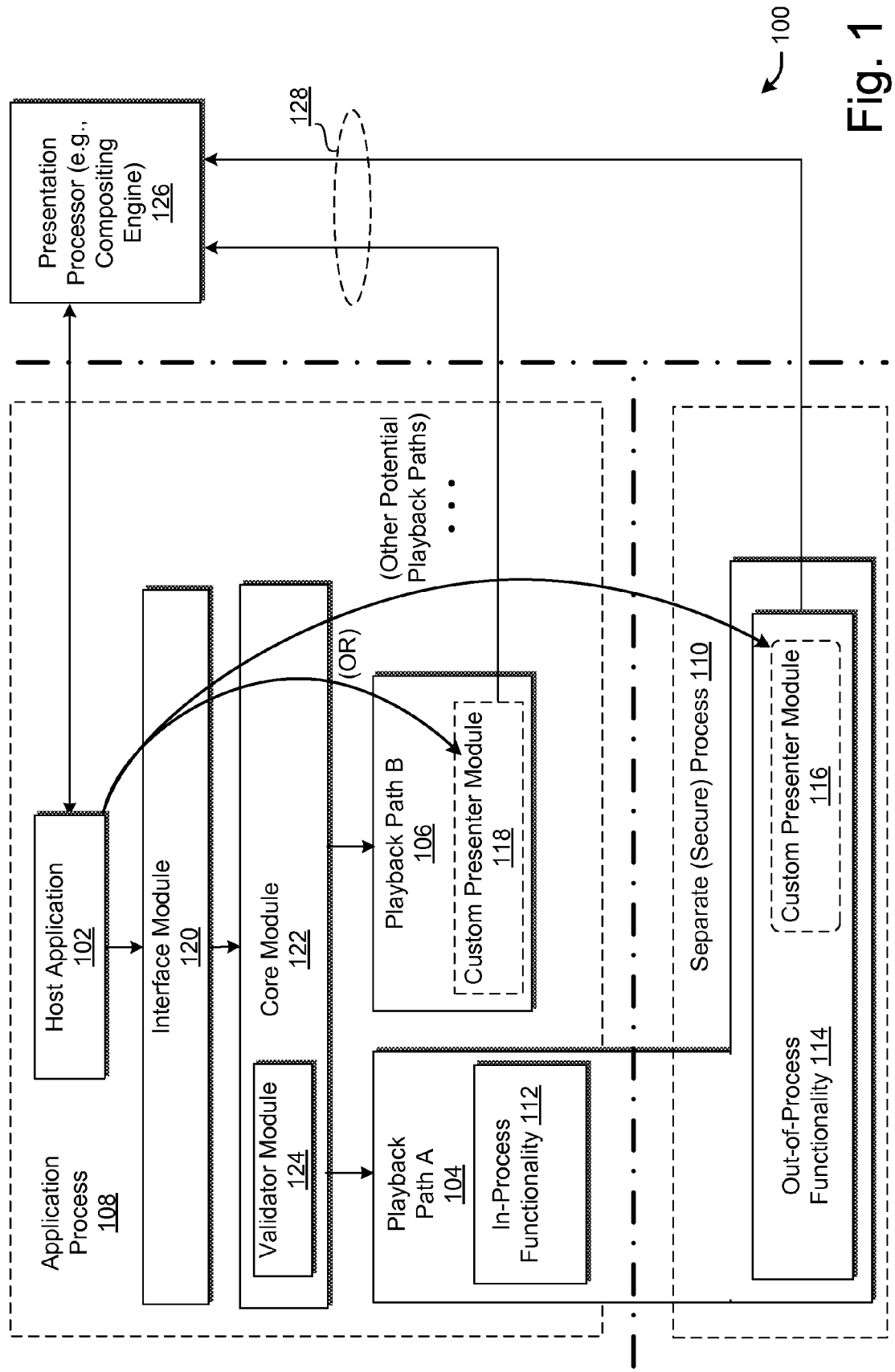
FIG. 1 shows an overview of an exemplary system for processing media information, involving plural media processing paths, at least one path including an in-process media processing pipeline and another path including an out-of-process media processing pipeline.

FIG. 1 shows an exemplary system 100 that includes an application 102 for presenting media information in at least two selectable media processing paths, namely, path A 104 and path B 106. The application 102 has an application process 108 associated therewith. Therefore, processing that is performed in the application process 108 is referred to as "in-process" (with respect to the application 102). The system includes at least one other process 110 that is separate from the application process 108. Because this process 110 is separate, it is referred to as "out-of-process" (with respect to the application 102). According to one exemplary implementation, media processing path A 104 includes at least one component (in-process process functionality 112) that performs operations in the application process 108, and at least one component (out-of-process functionality 114) that performs operations outside the application process 108, namely, in the separate process 110. On the other hand, media processing path B 106 includes at least one component that performs operations in the application process 108, and no components that perform operations out-of-process. In summary, the system 100 can integrate different modes of media processing, with at least one of the paths involving out-of-process processing, and at least one other path involving entirely in-process processing.

According to one exemplary implementation, the media processing paths (104, 106) can include a custom processing module. For example, media processing path 104 can include a custom presenter module 116, while media processing path 106 can include a custom presenter module 118. The role of a presenter module is to process media information in preparation for output to an output device. Other types of custom processing modules can be used. For example, another type of custom processing module can comprise a custom mixer module. The role of a mixer module is to combine together two or more separate media streams. To facilitate discussion, the custom processing module will be discussed mainly in the context of the custom presenter modules (116, 118), keeping in mind that this implementation is exemplary and non-limiting.

In any event, the qualifier "custom" means that the user (or other entity) can custom-design the presenter module to perform specific functions in a particular processing environment. In other words, the system 100 may specify a default presenter module which may be applicable to various default situations. The user (or other entity) can replace this default presenter module with a custom presenter module by, in effect, "plugging in" the custom presenter module in the place of the default presenter module. As will be described below in greater detail, the application 102 can specify the custom presenter module by providing ID information ($ID_{custom\_presenter}$) associated with the custom presenter module. Then, the media processing path in which the custom presenter module is to be deployed will instantiate the custom presenter module within its path. Instantiating the custom presenter module means that the media processing path creates the custom presenter module, e.g., by creating a programming object which performs the functions associated with the custom presenter module.

More specifically, the media processing path A 104 instantiates its custom presenter 116 in process 110, which is out-of-process with respect to the application process 108. On the other hand, the media processing path B 106 instantiates its custom presenter 118 in process 108, which is, tautologically speaking, in-process with respect to process 108. The notable advantage of this feature is that the application 102 can simply specify the use of a custom presenter module to be used in processing media information, without "worrying" about what media processing path the custom presenter module will be deployed in. Lower layers of the system 100 will examine the processing task at hand and automatically decide which media processing path should be used. The media processing path that is invoked can then automatically instantiate the custom presenter module and begin playing media information using that custom presenter module. Through this provision, the details of the path selection mechanism is abstracted (i.e., removed) from the application 102. This enables the application 102 to adopt a simpler and more efficient design.

As another advantage, different aspects of the system 100 may have different security levels associated therewith. A security level defines a degree of security that should be applied in processing media information, with a relatively high level of security providing many safeguards to prevent rogue entities from gaining access to the process for malicious ends, and a low level of security providing fewer such safeguards (or no such safeguards). For example, the separate process 110 may represent a process which is more secure than process 108. Thus, process 110 can be used to handle protected content, while process 108 can be used to process unprotected content. By virtue of the provisions described above, the application 102 does not need to include special provisions for handling protected content and unprotected content; this is because the media processing system 100 automatically selects a path having an appropriate security level. Further, in one exemplary scenario, the system 100 does not need to tailor the custom presenter modules to address different security level domains, as the same custom presenter module can be plugged into a secure pipeline and a non-secure pipeline. Another way of expressing this feature is to say that the application 102 can maintain a path-agnostic and security-level-agnostic approach to supplying the custom presenter module to the media processing paths.

Other components of the system 100 include an interface module 120 and a core module 122. The purpose of the interface module 120 is to provide a high-level interface between the application 102 and the lower levels of the system 100. That is, the interface module 120 provides a conduit for communicating and formulating high level commands to the lower levels of the system 100, and providing status information back to the application 102.

The core module 122 represents a general container which provides many different functions associated with the processing of media information, such as playlist management, download management, plug-in management, CD "ripping" management, caption management, license acquisition management, CD enumeration, subscription management, and so forth. In the context of this disclosure, one module of particular interest in the core module 122 is the validator module 124. The purpose of the validator module 124 is to determine which media processing path should be used to process a particular job at hand. In one case, the validator module 124 can make this decision based on a consideration of the media format of the media information to be processed, and/or the security level associated with the media information to be processed. That is, a first media processing path may be appropriate for a first set of media formats, while a second media processing path may be appropriate for a second set of media formats. This is because a particular media format may be associated with specific technology that should be applied to process this format. According to one variation, the system 100 may attempt to process media information using a first media processing path based on a first "guess" of what path is most appropriate. If this guess proves to be wrong (meaning that the media information cannot be effectively processed using the chosen media processing path), then the system 100 can select another media process path, and so on.

A final component in the system 100 is a presentation processor 126. The purpose of the presentation processor 124 is to perform some kind of final-stage processing on the media information that is output from one of the custom presenter modules (116, 118). For example, in one exemplary case, the presentation processor 126 can comprise a compositing engine. The compositing engine combines two or more media processing streams together to achieve some effect, such as by superimposing a picture on another picture, and so forth. The custom presenter modules (116, 118) are designed to specifically provide media information that can be consumed by the presentation processor 126.

In one example, the presentation processor 126 can exist in a different process from the application process 108 and the separate process 110. (The heavy dashed black lines in FIG. 1 show exemplary process boundaries.) The process in which the presentation process 126 "resides" can be a secure process or a non-secure process. In any event, the system 100 can use a secure mechanism or a non-secure mechanism in a communication path 128 used to pass media information from the custom presentation processors (116, 118) to the presentation processor 126. In other cases, the presentation processor 126 need not exist in a distinct process. For instance, in one scenario, the presentation process can "reside" in the application process 108. In another scenario, the presentation process can "reside" in the separate process 110. In any case, the presentation process should provide a level of security appropriate to a given processing environment and task at hand.

Generally, it may be useful to break different components of the system 100 into separate processes to facilitate validation of these components. That is, breaking the system 100 apart allows validation to be selectively performed on parts of the system 100, as opposed to the entire system 100. Breaking the presentation processor 126 out into a separate common process is also useful to better integrate the non-secure and secure processing paths (namely, paths 104 and 106); this contributes to the goal of providing a uniform approach to processing many different types of media information.

In operation, the system 100 can switch between different processing paths depending on the type of media information that is being processed (and potentially based on other factors as well). For example, consider a playlist that identifies a series of media content items to be played (such as files, etc.). Upon advancing to each content item in the playlist, the system 100 can select the path that is best suited for processing the media information contained in the content item. In some applications (such as fades and other transition effects), the system 100 can invoke more than one path (and potentially more than one custom presenter module) at the same time. In general, by virtue of the efficient techniques described above for invoking different paths containing custom presenters, the system 100 can move from one entry in the playlist to another in a seamless and efficient manner.

As a final note, in one exemplary implementation, a single entity (e.g., a single software development company) furnishes all of the media processing paths (104, 106, ...). In another implementation, different entities can build their own media process paths that accept a custom media presenter according to the above-described principles. In this scenario, an application can rely on a number of different media processing paths produced by different companies.

FIGS. 2-5 provide additional information regarding possible ways of implementing the architecture shown in FIG. 1.

Figure 2:
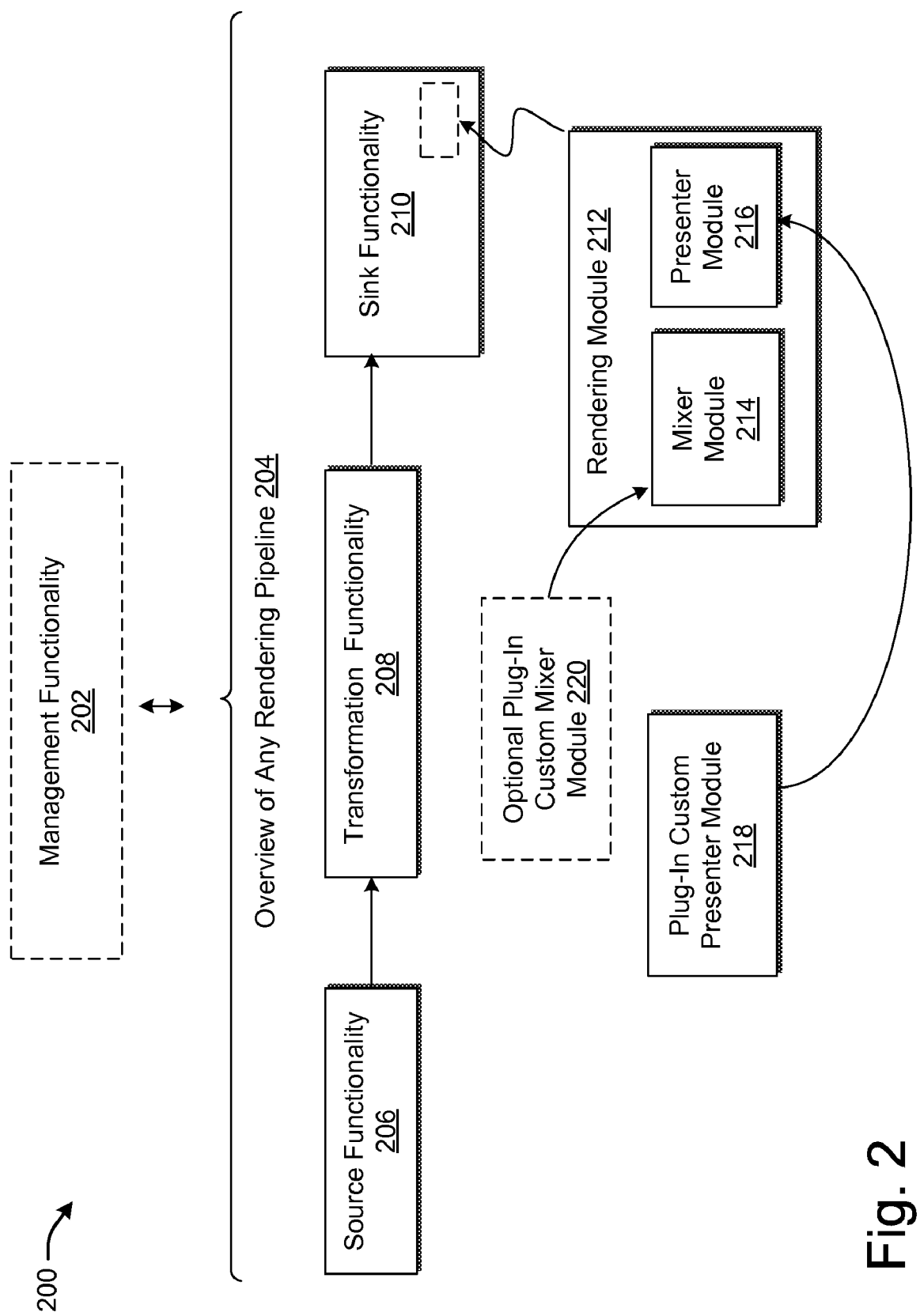
FIG. 2 shows an exemplary overview of a media processing pipeline, illustrating the role of a plug-in custom processing module within the pipeline.

Beginning with FIG. 2, this figure shows a generic overview 200 of a media processing path. Namely, this figure shows general components that can apply to any processing path, such as media processing path A 104 or media processing path B 106. Later figures (i.e., FIGS. 4 and 5) present additional details regarding specific media processing paths.

The generic media processing path includes some kind of management functionality 202 for managing the creation and operation of a media processing pipeline 204. The media processing pipeline 204 is also referred to as a graph herein, meaning that it can select and combine a plurality of components together according to a connection scheme. Different technologies may use different management functionalities 202 to create and govern the operation of different graphs. These different technologies may use different paradigms, such that a graph constructed according to one technology may be incompatible with a graph constructed according to another technology.

In any technology, the media processing pipeline 204 can be conceptualized as having three different types of components. A first type of component comprises source functionality 206. The source functionality 206 supplies media information from one or more sources of media information. A second type of component comprises transformation functionality 208. The transformation functionality 208 performs some intermediary processing to transform the media information from one form to another (e.g., by compressing it, resizing it, changing its color space, and so on). A third class of components comprises sink functionality 210. The sink functionality 210 supplies the output of the transformation functionality 208 to one or more target destinations.

One exemplary component of the sink functionality 210 can comprise a rendering module 212. The rendering module 212 renders the media information for output to one or more destinations. The rendering module 212 can comprise a mixer module 214 and a presenter module 216, as well as other components (not shown). As mentioned, the purpose of the mixer module 214 is to combine two or more streams of media information together. The purpose of the presenter module 216 is to provide some kind of processing to provide output information conformant to the expectations of an identified output device.

As mentioned above, a user can replace the default presenter module 216 with a custom presenter module 218. In the context of FIG. 2, custom presenter modules (116, 118) are deployed in media processing paths A and B (104, 106). The custom presenter module 218 can supply presentation processing that is tailored to a specific environment. It is also possible to replace the mixer module 204 with a custom mixer module 220. The custom mixer module 220 supplies a custom mixing function that is tailored to a specific environment.

Figure 3:
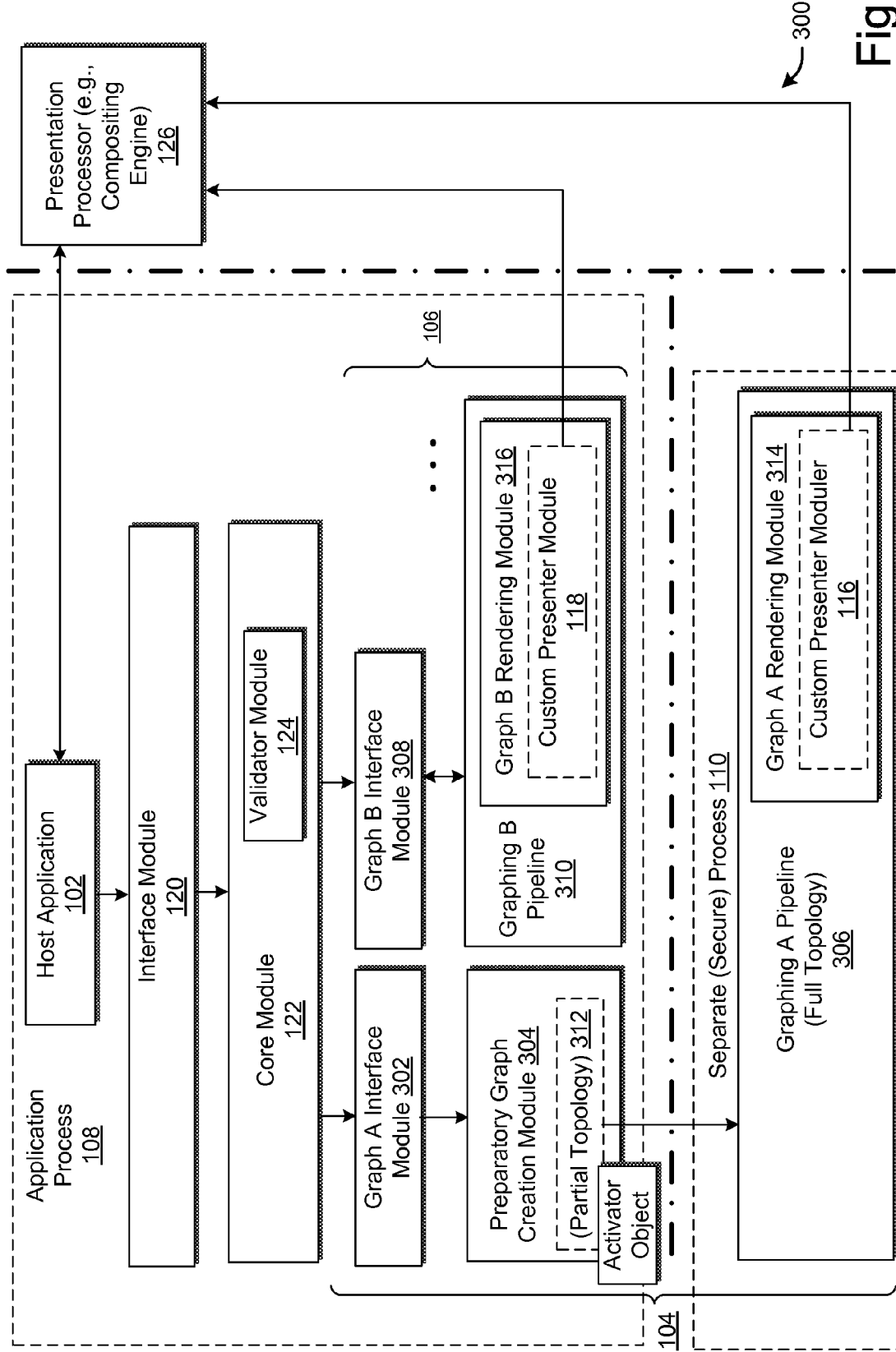
FIG. 3 shows a more detailed exemplary implementation of the system shown in FIG. 1.

FIG. 3 shows a system 300 that provides one exemplary and non-limiting implementation of the system 100 of FIG. 1. FIG. 3 also illustrates how the pipeline concepts shown in FIG. 2 can be applied to implement the media processing paths (104, 106) shown in FIG. 1. Features that are common to both FIGS. 1 and 3 are assigned the same reference numbers. Because these common features have been already described in the context of FIG. 1, an explanation of these common features will be omitted in the following discussion.

FIG. 3 shows that media processing path A 104 includes various in-process components (302, 304), and various out-of-process components 306. Media processing path B 106 includes only in-process components (308, 310). The components (302-306) that populate media processing path A 104 comprise a first graph (graph A) constructed according to a first technology. The components (308, 310) that populate media processing path B 106 comprise a second graph (graph B) constructed according to a second technology.

The first and second technologies may represent non-compatible technologies, such that graph A is governed by a different paradigm than graph B. According to one exemplary and non-limiting case, graph A may represent MEDIA FOUNDATION technology provided by Microsoft Corporation of Redmond, Wash., and as described, for instance, in commonly assigned U.S. Pat. No. 7,609,653, entitled "Resolving Partial Media Topologies," naming Samuel Amin et al. as inventors, and which is incorporated by reference herein in its entirety. According to one exemplary and non-limiting case, graph B may represent DIRECTSHOW technology provided by Microsoft Corporation, and as described, for instance, in commonly assigned U.S. Pat. No. 5,913,038, entitled "System and Method for Processing Multimedia Data Streams Using Filter Graphs," naming Laurence K. Griffiths as inventor, and which is incorporated by reference in its entirety. Further background information regarding DIRECTSHOW technology can also be found on Microsoft Corporation's MSDN Library website (MSDN.com), as well as in a number of commercially available publications, such as *Programming Microsoft DirectShow* by Michael Linetsky, published by Wordware Publishing (Oct. 15, 2001), and *Programming Microsoft DirectShow for Digital Video and Television* by Mark D. Pesce, published by Microsoft Press (Feb. 12, 2003).

Figure 4:
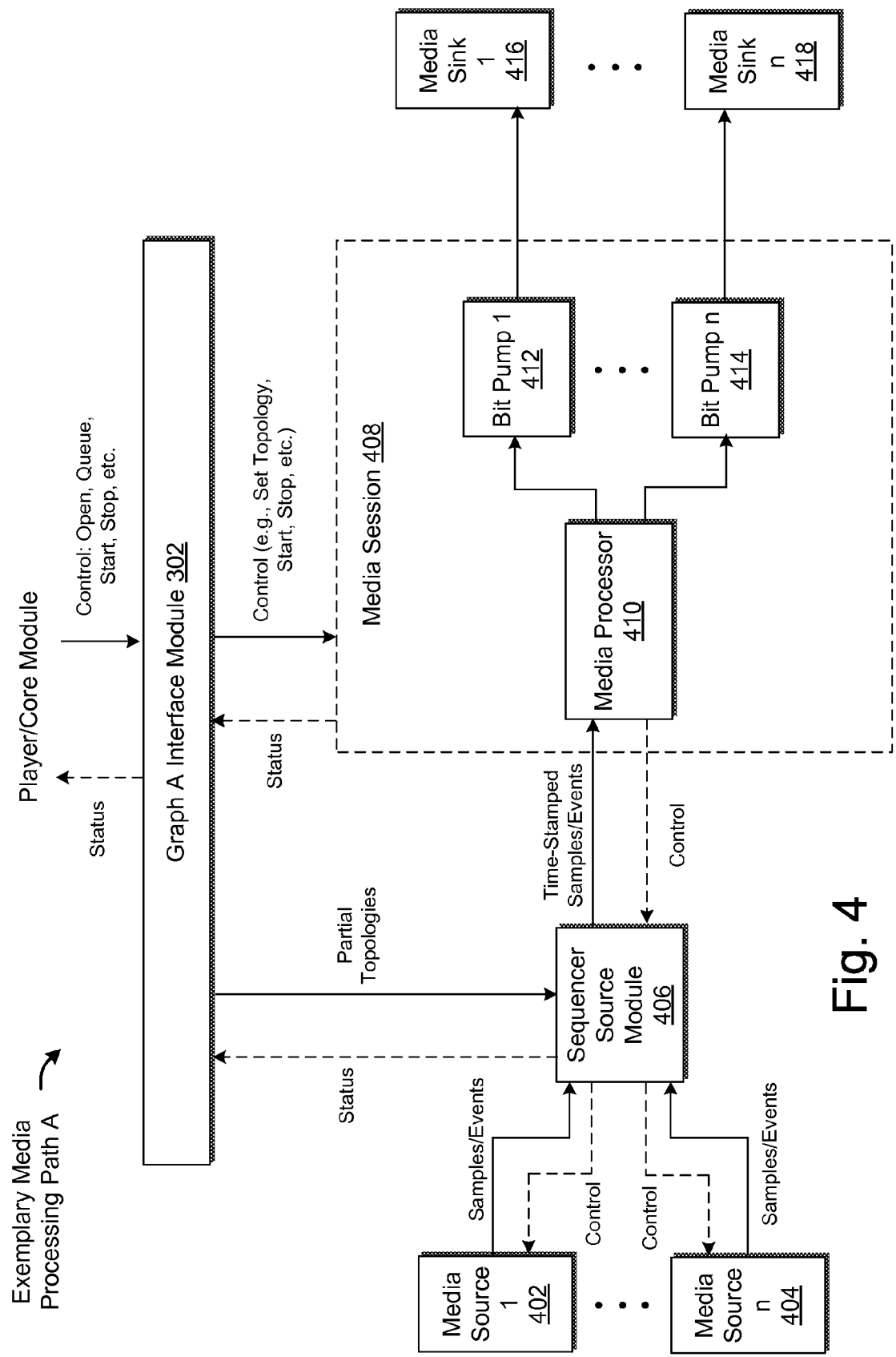
FIG. 4 shows exemplary details of a first media processing path used in the system of FIG. 3.
Figure 5:
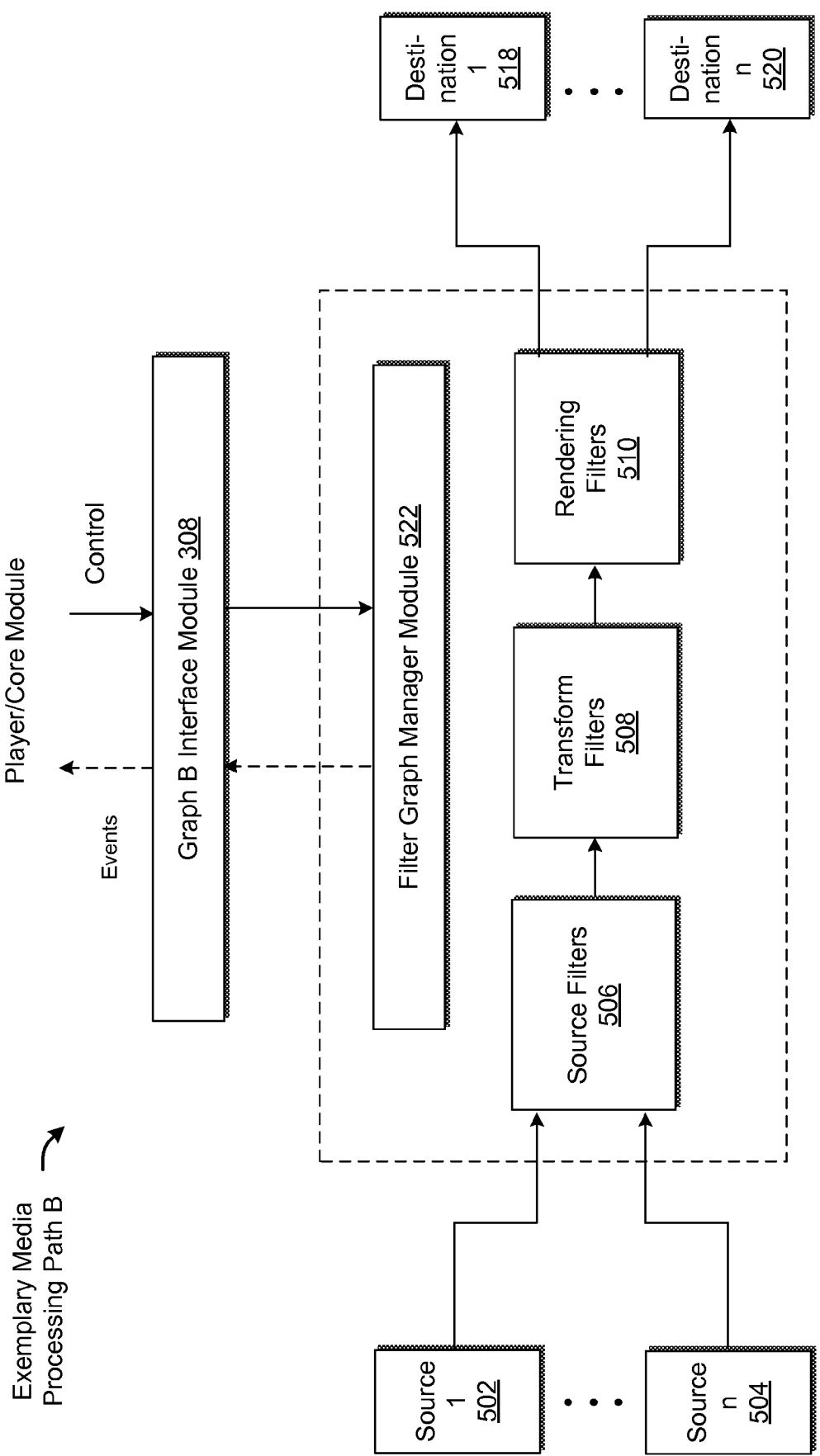
FIG. 5 shows exemplary details of a second media processing path used in the system of FIG. 3.

By way of overview, FIG. 3 shows high-level features of the MEDIA FOUNDATION processing path 104 and the DIRECTSHOW processing path 106. FIG. 4 provides further exemplary details regarding the MEDIA FOUNDATION processing path 104, while FIG. 5 provides further exemplary details regarding the DIRECTSHOW processing path 106. These processing paths (104, 106) are modified according to the invention in a number of ways. For example, the processing paths (104, 106) are modified to accommodate the setting of the custom presenter modules (116, 118) in the rendering paths (104, 106), as will be described below.

Beginning with the MEDIA FOUNDATION processing path 104 (graph A), FIG. 3 shows that the path 104 includes a graph interface module 302. This interface module 302 acts as a go-between in which higher level components in the system 300 can interface with the graph A, that is, by invoking various functions associated with graph A and by receiving status information from graph A.

The processing path 104 also includes preparatory graph creation module 304. The purpose of the preparatory graph creation module 304 is to construct a partial topology 312 that describes the media processing pipeline that will be used to process the media information in path 104. More generally, a topology is a data structure which describes the manner in which components are combined together, and hence describes the data flow through the graph. A partial topology is partial in the sense that it is not yet complete, meaning that, at this stage, the graph is not finally constructed and ready to process data. The partial topology may also be incomplete in the sense that it does not fully define the transformations that are applied in the graph.

The preparatory graph creation module 304 can apply an activation object to encapsulate instructions used to create a sink of the media processing pipeline, within the separate process 110. That is, the preparatory graph creation module 304 forms the activator object and passes it to the secure process 110 for activation (to instantiate sink components of an out-of-process media pipeline 306). This is one exemplary and non-limiting way that system 100 can marshal graph data across process boundaries.

The separate process itself 110 can represent functionality for constructing the final media processing pipeline 306 based on the partial topology information passed to the separate process 110 by the preparatory graph creation module 304, including, in part, the activator object. The sink functionality of the media processing pipeline 306 comprises a rendering module 314 (which was introduced in the context of FIG. 2). The rendering module 314, in turn, includes the custom presenter module 116.

Turning now to the DIRECTSHOW processing path 106 (graph B), FIG. 3 shows that this path 106 includes a graph interface module 308. This interface module 308 acts as a go-between in which higher level components in the system 300 can interface with the graph B, that is, by invoking various functions associated with graph B and receiving status information from the graph B.

The path 106 includes an in-process media processing pipeline 310. The sink functionality of the media processing pipeline 310 comprises a rendering module 316. The rendering module 316, in turn, includes the custom presenter module 118.

In both paths (104, 106), the custom presenter modules (116, 118) send frames of media information to the presentation process 126, which may comprise a compositing engine in a secure or non-secure presentation process.

In order to interact with the system 300 shown in FIG. 3, the interface module 120 can expose various interfaces for setting the customer presenter module (116, 118). For example, a put_presenter method can be used to supply a custom presenter module. This method has the following exemplary syntax:

```
HRESULT put_presenter(
    [in] REFGUID clsidPresenter,
    [in] BYTE * pContext,
    [in] DWORD cbContext
);
```

The "clsidPresenter" parameter defines an ID associated with the custom presenter module (also referred to as $ID_{custom\_presenter}$ herein). Possible values include CLSID_NULL (which instructs the system 300 to use a default presenter module), as well as a number of other possible IDs associated with custom presenter modules. The "pContext" parameter defines data that can be passed to the presenter module upon activation. The "cbContext" parameter defines the size of the context data in bytes. The put_presenter method returns an OK signal if the setting operation is successful, and if not, it returns an error code.

A similar interface to that described above can be used to set a custom mixer module, or other type of custom processing module.

As discussed in the context of FIG. 1, the core module 122 performs a range of functions associated with the playback of media information. Among those functions is the validation function performed by the validator module 124. The validator module 124 can determine which runtime (processing path) should be invoked to play media information by examining a content item (e.g., a file) that provides the media information (e.g., by examining the header of the file which may reveal the format of the media information contained therein).

FIG. 4 shows further details regarding functionality that can be employed in the MEDIA FOUNDATION processing path 104 (graph A). The media processing pipeline shown in FIG. 4 will be explained from left to right.

To begin with, the pipeline 4 comprises a number of media sources (402, 404). The media sources (402, 404) represent an abstraction of components that supply media samples to the pipeline for consumption.

The pipeline also includes a sequencer source module 406. The sequencer source module 406 accepts topologies having multiple sources and aggregates these sources as a single source. The sequencer source module 406 can also queue topologies for processing. The sequencer source module 306 can also provide a dialog with a media session 408 to queue and start consecutive topologies.

The media session 408 itself handles the feeding of data to sinks and switching seamlessly between consecutive topologies. It includes a media processor 410. The media processor 410 coordinates the flow of media data through the pipeline. Namely, this processor 410 coordinates the extraction of data from one or more media sources, the transformation of the data, and the forwarding of the processed data to one or more media sinks. The media session 408 also includes one or more bit pumps (412, 414). The bit pumps (412, 414) communicate with associated sinks (416, 418) by allocating samples and feeding the samples into the sinks (416, 418).

The sinks (416, 418) themselves represents the end of the media processing pipeline. These sinks (416, 418) render the data in different ways appropriate to a given environment. For example, an audio media sink can render audio content on a sound card, while a video media sink can render video content on a screen, and so forth.

Finally, the graph interface module 302 receives general control instructions from higher levels in the system 300, and supplies status information from the graph to the higher levels.

FIG. 5 shows further details regarding functionality that can be employed in the DIRECTSHOW processing path 106 (graph B). The media processing pipeline shown in FIG. 5 will be explained from left to right.

To begin with, the pipeline comprises a number of media sources (502, 504). The media sources (502, 504) represent different sources of media information, such as a network, camera, file, and so forth.

The media sources (502, 504) feed information into a collection of filters, including source filters 506, transform filters 508, and rendering filters 510. A source filter supplies data to the media processing pipeline. A transform filter receives an input stream and applies some type of transformation to the input stream to provide an output stream. A rendering filter receives the output of one or more transform filters and presents the output(s) to an output device. Each filter includes a number of inputs, referred to as pins. Filters can be placed in various states, such as "stopped," "running," "paused," and so forth.

The media sinks (512, 518) represent output devices. Exemplary output devices include files, sound cards, display devices, and so forth.

The DIRECTSHOW graph also includes a filter graph manager 522. This module 522 governs the filters (506, 508, 510). It performs various functions, such as: coordinating the construction of the graph; conveying events to higher levels of the system 300; providing a reference clock; processing state changes in the filters, and so forth. The graph interface module 302 receives general control instructions from higher levels in the system 300, and supplies status information from the graph to the higher levels.

B. Exemplary Manner of Operation

Figure 6:
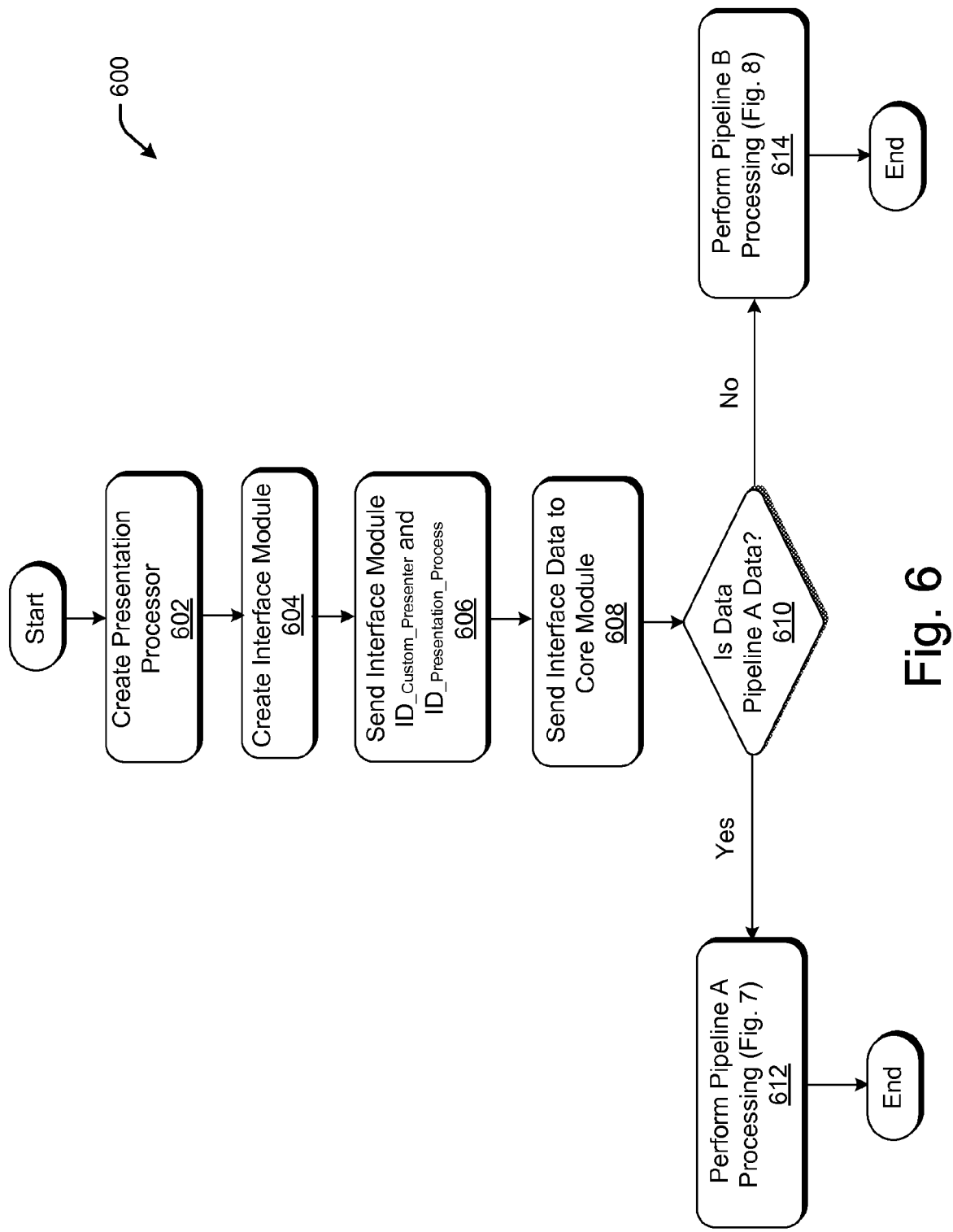
FIG. 6 shows an exemplary method for processing media information using a media processing framework that includes a plurality of media processing paths.

FIG. 6 shows a procedure 600 which explains an exemplary manner of operation of the systems (100, 300) shown in FIGS. 1 and 3. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure.

In step 602, the procedure 600 creates the presentation processor 126, which may comprise a compositing engine. In one exemplary implementation, the procedure 600 also receives ID information ($ID_{presentation\_process}$) describing the presentation process that has been created.

In step 604, the procedure 600 creates the interface module 120.

In step 606, the application 102 sends the interface module 120 ID information ($ID_{custom\_presenter}$) which identifies a custom presenter module. One way that this can be performed is via the put_presenter method described in Section A above. The application 102 also sends the ID information ($ID_{presentation\_process}$) that identifies the presentation process associated with the presentation processor 126. Other implementations can optionally omit the above-described ID-specification operations. Still other implementations can define and pass down other kinds of metadata used in the construction of the graph, or used for other purposes.

In step 608, the interface module 120 sends the data collected in step 606 to the core module 122.

In step 610, the core module 122 (e.g., the validator module 124 of the core module 122) determines which processing path should be invoked. The validator module 124 can make this decision based, in part, on the format of the media information that is to be processed.

Figure 7:
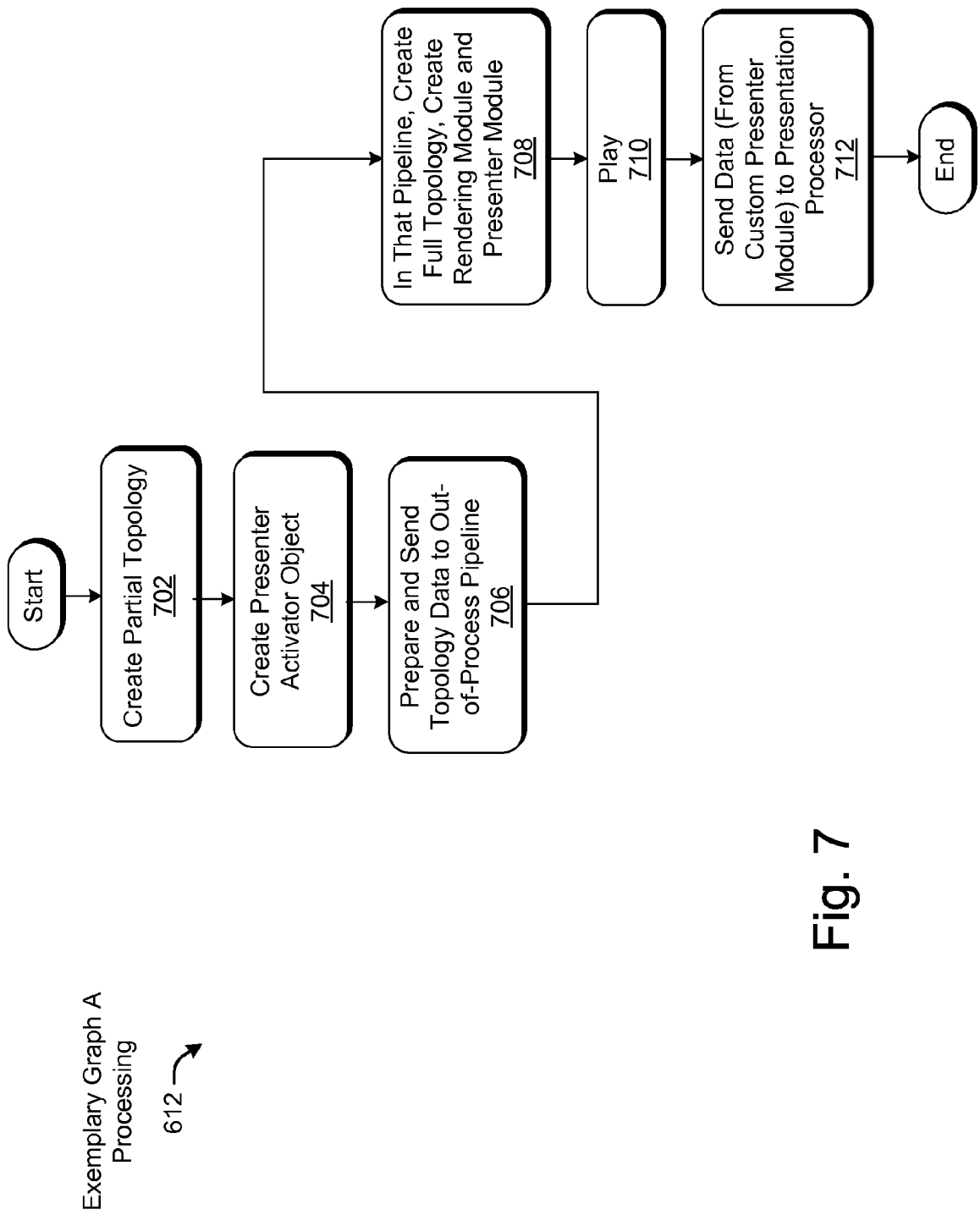
FIG. 7 shows an exemplary method for processing media information using a first media processing path invoked by the method of FIG. 6 (which utilizes an out-of-process media processing pipeline).

In step 612, if a decision has been made to use media processing path A 104, then pipeline processing is performed using graph technology associated with media processing path A 104. FIG. 7 provides more information regarding exemplary processing operations involved in media processing path A 104. Processing path A 104 may represent a MEDIA FOUNDATION processing path.

Figure 8:
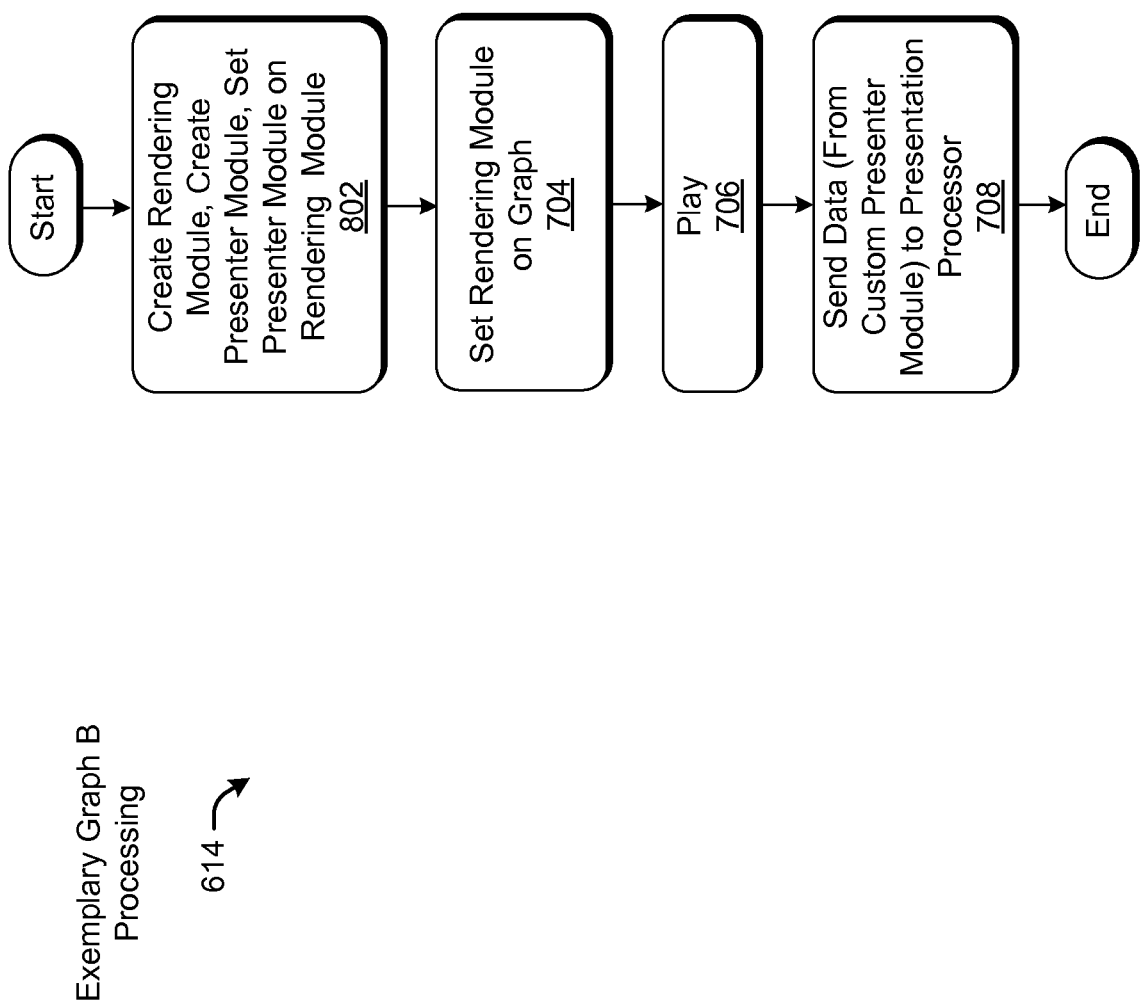
FIG. 8 shows an exemplary method for processing media information using a second media processing path invoked by the method of FIG. 6 (which utilizes an in-process media processing pipeline).

In step 614, if a decision has been made to use media processing path B 106, then pipeline processing is performed using graph technology associated with media processing path B 106. FIG. 8 provides more information regarding exemplary processing operations involved in media processing path B 106. Processing path B 106 may represent a DIRECTSHOW processing path.

Advancing to FIG. 7, this figure shows the processing steps 612 that can be used in processing path A 104.

To begin with, in step 702, the processing path A 104 creates a partial topology. The partial topology may comprise a specification of the data flow and data transformation within a graph that is not yet fully resolved in all respects.

In step 704, the processing path A 104 creates an activator object. The activator object is used to encapsulate information used to construct a sink of the media processing pipeline, within the secure process 110. For example, step 704 can communicate an identification of the customer presenter module to be used, and the presentation processor 126 to be used.

In step 706, the processing path A 104 sends all of the information necessary to construct the full graph to the secure process 110, including, in part, the activator object. Sending data in this manner comprises marshalling data across process boundaries.

In step 708, the secure process 110 constructs the full topology based on the information provided in step 706. Constructing the full topology realizes the media processing pipeline 306. The secure process 110 also creates the rendering module 314, and the custom presenter module 116.

In step 710, the processing path A 104 plays the media information using the thus-created media processing pipeline 300.

In step 712, the processing path A 104 sends the data generated by the rendering module 314 to the presentation processor 126 using the $ID_{presentation\_process}$ information associated with the presentation process.

Advancing to FIG. 8, this figure shows the processing steps 614 that can be used in processing path B 106.

To begin with, in step 802, the processing path B 106 creates the rendering module 316, creates the custom presenter module 118, and sets the customer presenter module 118 on the rendering module 316.

In step 804, the processing path B 106 sets the thus-created rendering module 316 on the graph B pipeline 310. This pipeline 310 (along with its custom presenter module 118) is in-process with respect to the application 102.

In step 806, the processing path B 106 plays the media information using the thus-created media processing pipeline 310.

In step 808, the processing path B 106 sends the data generated by the rendering module 316 to the presentation processor 126 using the $ID_{presentation\_process}$ information associated with the presentation process.

Figure 9:
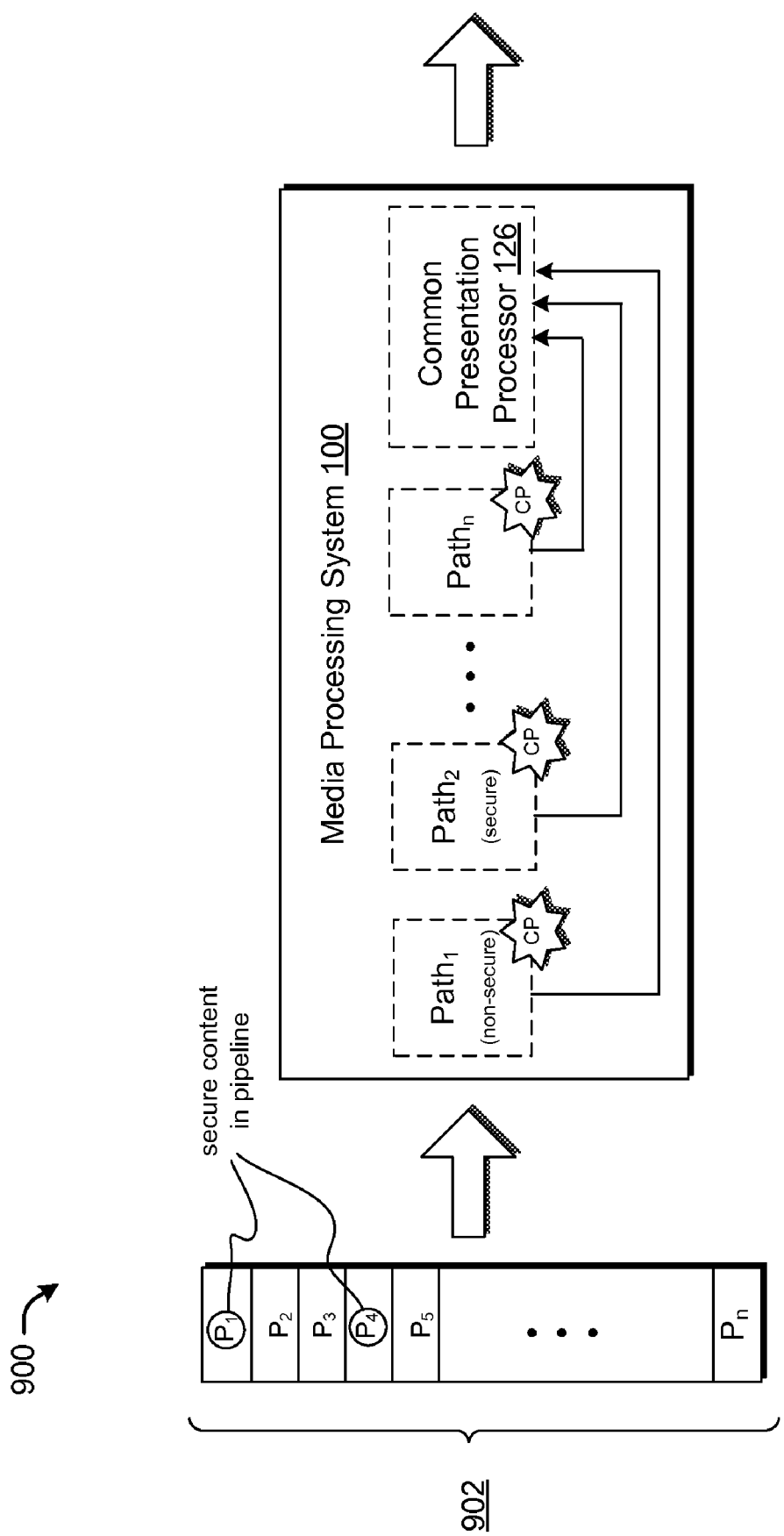
FIG. 9 shows an exemplary use of the media processing functionality illustrated in the previous figures.

FIG. 9 shows an application 900 of the above-described media processing system 100. In this application 900, the system 100 processes a media playlist 902 that contains a plurality of media content items ($P_1, P_2, \ldots P_n$). The content items may represent files, DVD selections, network-accessible media information, and so forth. These different content items may have different formats associated therewith. These different content items may also represent a combination of protected and unprotected content. For example, content items $P_1$ and $P_4$ are protected content, while the other content items are not. The system 100 addresses the presence of different kinds of media content items by invoking different media processing paths. Namely, the system 100 selects the paths that are best suited for processing the formats and security types of the media content items. As figuratively indicated by the star labeled "CP," the system 100 can instantiate a custom presenter in different paths.

By virtue of the features described above, the media processing system can quickly and gracefully transition from one media content item to another, even if these content items invoke different processing paths. The different paths feed into the common presentation processor 126. This feature is useful because it adds uniformity to the multi-path rendering technique. Also, the presentation processor 126 can be used to combine the outputs of different processing paths together, e.g., so as to accomplish transitional special effects when switching from one media content item to another (which employ different formats).

Still other applications of the system 100 are possible.

C. Exemplary Computer Environment

Certain aspects of the systems and procedures described above can be implemented using a computer device. FIG. 10 shows an exemplary computer environment 1000 which can implement aspects of these systems and procedures.

The computing environment 1000 includes a general purpose or server type computer 1002 and a display device 1004. However, the computing environment 1000 can include other kinds of computing equipment. For example, although not shown, the computer environment 1000 can include handheld or laptop devices, set top boxes, game consoles, etc. Further, FIG. 10 shows elements of the computer environment 1000 grouped together to facilitate discussion. However, the computing environment 1000 can employ a distributed processing configuration. In a distributed computing environment, computing resources can be physically dispersed throughout the environment.

Exemplary computer 1002 includes one or more processors or processing units 1006, a system memory 1008, and a bus 1010. The bus 1010 connects various system components together. For instance, the bus 1010 connects the processor 1006 to the system memory 1008. The bus 1010 can be implemented using any kind of bus structure or combination of bus structures, including a memory bus or memory controller, a peripheral bus, an accelerated graphics port, and a processor or local bus using any of a variety of bus architectures.

Computer 1002 can also include a variety of computer readable media, including a variety of types of volatile and non-volatile media, each of which can be removable or non-removable. For example, system memory 1008 includes computer readable media in the form of volatile memory, such as random access memory (RAM) 1012, and non-volatile memory, such as read only memory (ROM) 1014. ROM 1014 includes an input/output system (BIOS) 1016 that contains the basic routines that help to transfer information between elements within computer 1002, such as during start-up. RAM 1012 typically contains data and/or program modules in a form that can be quickly accessed by processing unit 1006.

Other kinds of computer storage media include a hard disk drive 1018 for reading from and writing to a non-removable, non-volatile magnetic media, a magnetic disk drive 1020 for reading from and writing to a removable, non-volatile magnetic disk 10922 (e.g., a "floppy disk"), and an optical disk drive 1024 for reading from and/or writing to a removable, non-volatile optical disk 1026 such as a CD-ROM, DVD-ROM, or other optical media. The hard disk drive 1018, magnetic disk drive 1020, and optical disk drive 1024 are each connected to the system bus 1010 by one or more data media interfaces 1028. Alternatively, the hard disk drive 1018, magnetic disk drive 1020, and optical disk drive 1024 can be connected to the system bus 1010 by a SCSI interface (not shown), or other coupling mechanism. Although not shown, the computer 1002 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 1002. For instance, the readable media can store the operating system 1030, application-specific functionality 1032, other program modules 1034, and program data 1036. One or more of the above-identified computer readable media can provide logic functionality (e.g., computer code) that can be used to implement aspects of the functionality described in preceding figures of this disclosure.

The computer environment 1000 can include a variety of input devices. For instance, the computer environment 1000 includes the keyboard 1038 and a pointing device 1040 (e.g., a "mouse") for entering commands and information into computer 1002. The computer environment 1000 can include other input devices (not illustrated), such as a microphone, joystick, game pad, satellite dish, serial port, scanner, card reading devices, digital or video camera, etc. Input/output interfaces 1042 couple the input devices to the processing unit 1006. More generally, input devices can be coupled to the computer 1002 through any kind of interface and bus structures, such as a parallel port, serial port, game port, universal serial bus (USB) port, etc.

The computer environment 1000 also includes the display device 1004. A video adapter 1044 couples the display device 1004 to the bus 1010. In addition to the display device 1004, the computer environment 1000 can include other output peripheral devices, such as speakers (not shown), a printer (not shown), etc.

Computer 1002 operates in a networked environment using logical connections to one or more remote computers, such as a remote computing device 1046. The remote computing device 1046 can comprise any kind of computer equipment, including a general purpose personal computer, portable computer, a server, etc. Remote computing device 1046 can include all of the features discussed above with respect to computer 1002, or some subset thereof.

Any type of network 1048 can be used to couple the computer 1002 with remote computing device 1046, such as the WAN 402 of FIG. 4, a LAN, etc. The computer 1002 couples to the network 1048 via network interface 1050 (e.g., the interface 416 shown in FIG. 4), which can utilize broadband connectivity, modem connectivity, DSL connectivity, or other connection strategy. Although not illustrated, the computing environment 1000 can provide wireless communication functionality for connecting computer 1002 with remote computing device 1046 (e.g., via modulated radio signals, modulated infrared signals, etc.).

Conclusion

In closing, a number of features were described herein by first identifying exemplary problems that these features can address. This manner of explication does not constitute an admission that others have appreciated and/or articulated the problems in the manner specified herein. Appreciation and articulation of the problems present in the relevant arts are to be understood as part of the present invention. More specifically, there is no admission herein that the features described in the Background section of this disclosure constitute prior art. Further, the description of a limited set of problems in the Background section does not limit the application of invention to solving only those problems; it can be applied to problems and environments not expressly identified herein. Further, the subject matter set forth in the Summary section and the Abstract of this disclosure do not limit the subject matter set forth in the claims.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented by a computing device for processing media information, the method comprising:
    receiving a playlist that specifies a plurality of media content items, wherein at least two of the media content items have different media formats and security levels associated therewith;
    playing the media content items in the playlist using a system having plural media processing paths;
    determining, by the computing device, different media processing paths to process different media content items in the playlist based in part on the media formats and the security levels of the media content items, wherein the different media processing paths use a plug-in custom processing module; and
    creating a graph that includes a media processing pipeline for each of the different media processing paths, the custom processing module being instantiated from within the media processing pipeline by the media processing pipeline.

2. The method of claim 1, wherein the different media processing paths send output data to a common presentation process which combines the output of at least two of the different media processing paths to achieve a particular media effect.

3. The method of claim 1, wherein the custom processing module is a custom presenter module which prepares the media content items for output to an output device.

4. The method of claim 1, wherein the graph for rendering the media content items includes the custom processing module, and wherein the playing the media content items includes using the created graph.

5. The method of claim 4, wherein the plural media processing paths include:
    a first graph that includes a media processing pipeline that is in-process with respect to an application which interacts with the media processing pipeline, wherein the application sets the custom processing module in the in-process media processing pipeline; and
    a second graph that includes a media processing pipeline that is out-of-process with respect to the application, wherein the application sets the custom processing module in the out-of-process media processing pipeline, whereby details of the custom processing module's operation within the out-of-process media processing pipeline are removed from the application.

6. The method of claim 5, wherein the second graph further includes a sequencer source module configured to provide a dialog with a media session to queue and start consecutive topologies, the topologies having media information comprising multiple sources, the media session being configured to feed the media content items to one or more sinks and switch seamlessly between consecutive topologies.

7. The method of claim 5, wherein the out-of-process media processing pipeline is a secure process.

8. The method of claim 1, wherein the media content items are in stored in different audio formats.

9. The method of claim 1, wherein the media content items are in stored in different video formats.

10. A method comprising:
    receiving a playlist that includes a plurality of media content items, at least one of the media content items having a different media format or security level than another one of the media content items;
    playing the media content items in the playlist using a system having a plurality of media processing paths, different media processing paths being applied to different media content items in the playlist based on at least one of the media format or the security level associated with each of the media content items; and
    employing a common plug-in custom processing module which is instantiated by a corresponding one of the different media processing paths to facilitate playback of the media content items by at least one of the plurality of media processing paths, wherein the plurality of media processing paths are established prior to the instantiation of the common plug-in custom processing module.

11. The method of claim 10, wherein the media content items have a different media format and a same security level, and wherein the different media processing paths are applied to different media content items in the playlist based at least in part on the media format of the media content items.

12. The method of claim 10, wherein the different media processing paths send output data to a common presentation process which combines the output of at least two of the plurality of media processing paths to achieve a particular media effect.

13. The method of claim 10, wherein the custom processing module is a custom presenter module which prepares the media content items for output to an output device.

14. The method of claim 10, further comprising creating a graph for rendering the media content items that includes the custom processing module, and wherein the playing the media includes using the created graph.

15. The method of claim 10, wherein the plurality of media processing paths include:
   a first graph that includes a media processing pipeline that is in-process with respect to an application which interacts with the media processing pipeline; and
   a second graph that includes a media processing pipeline that is out-of-process with respect to the application.

16. One or more computer-readable storage devices including instructions that, when executed by one or more processors, cause the one or more processors to perform acts comprising:
   receiving a playlist that includes a plurality of media content items, at least two of the media content items having different media formats;
   playing the media content items in the playlist using a system having a plurality of media processing paths, different media processing paths being applied to different media content items in the playlist based at least in part on the media formats of the media content items, the plurality of media processing paths to include:
      a first graph that includes a media processing pipeline that is in process with respect to an application which interacts with the media processing pipeline, the application setting the custom processing module in the in-process media processing pipeline, and
      a second graph that includes a media processing pipeline that is out-of-process with respect to the application, the application setting the custom processing module in the out-of-process media processing pipeline; and
   employing a common plug-in custom processing module which is instantiated from within, and by, a corresponding one of the different media processing paths to facilitate playback of the media content items by at least one of the plurality of media processing paths, wherein the plurality of media processing paths are established prior to the instantiation of the common plug-in custom processing module.

17. The one or more computer-readable storage devices of claim 16, wherein the different media processing paths are further applied to different media content items in the playlist based at least in part on different security levels of the media content items.

18. The one or more computer-readable storage devices of claim 17, wherein the out-of-process media processing pipeline is a secure process.

19. The one or more computer-readable storage devices of claim 16, wherein the second graph further includes a sequencer source module configured to provide a dialog with a media session to queue and start consecutive topologies, the topologies having media information comprising multiple sources, the media session being configured to feed the media content items to one or more sinks and switch seamlessly between consecutive topologies.

20. The one or more computer-readable storage devices of claim 16, wherein the media content items are stored in different audio formats or different video formats.

* * * * *